(12) United States Patent
Cupolillo et al.

(10) Patent No.: US 10,214,265 B2
(45) Date of Patent: Feb. 26, 2019

(54) BUOY FOR THE INSTALLATION OF UNDERWATER EQUIPMENT

(71) Applicant: IPB-GR Industria Mecãnica LTDA, Rio de Janeiro (BR)

(72) Inventors: Gilmar Souza Cupolillo, Rio de Janeiro (BR); Renato César Martins Vieira, Rio de Janeiro (BR)

(73) Assignee: IPB-GR INDUSTRIA MECÃNICA LTDA, Rio de Janeiro (BR)

( * ) Notice: Subject to any disclaimer, the term of this patent is extended or adjusted under 35 U.S.C. 154(b) by 92 days.

(21) Appl. No.: 15/337,621

(22) Filed: Oct. 28, 2016

(65) Prior Publication Data

US 2017/0120989 A1    May 4, 2017

(51) Int. Cl.
*F16L 1/24* (2006.01)
*B63B 22/00* (2006.01)

(52) U.S. Cl.
CPC .............. *B63B 22/00* (2013.01); *F16L 1/24* (2013.01); *B63B 2207/00* (2013.01); *B63B 2207/04* (2013.01); *B63B 2231/40* (2013.01); *B63B 2241/08* (2013.01)

(58) Field of Classification Search
CPC .... F16L 1/24; B63B 2207/00; B63B 2207/04; E21B 17/012
See application file for complete search history.

(56) References Cited

U.S. PATENT DOCUMENTS 4,474,129 A * 10/1984 Watkins ................ B63B 21/663
                                                       114/243
4,480,054 A * 10/1984 Enderle ................. C08J 9/0061
                                                       521/137

FOREIGN PATENT DOCUMENTS

| BR | PI9500622 | 10/1995 |
| BR | PI9306875 | 12/1998 |
| BR | 102012029254 | 11/2012 |

\* cited by examiner

*Primary Examiner* — Andrew Polay
(74) *Attorney, Agent, or Firm* — Knobbe, Martens, Olson & Bear LLP

(57) ABSTRACT

The instant invention relates to a buoy for the installation of underwater equipment, preferably used in equipment associated with petroleum underwater exploration, comprising an outer body, which has a top lid and a bottom lid, passage pipes, which extends internally along the entire length of the buoy, being provided also of a plurality of thrust elements arranged internally, which consist of gas microbubbles with quartz spherical body, vinyl material of closed cells and resin.

5 Claims, 3 Drawing Sheets

Section A-A

BUOY FOR THE INSTALLATION OF UNDERWATER EQUIPMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The instant invention relates to a buoy for the installation of underwater equipment, preferably used in equipment associated with petroleum underwater exploration, where the installation or handling of the buoy is conducted through a remotely operated vehicle (ROV).

DESCRIPTION OF THE RELATED ART

With the growth of the oil and gas industry in order to meet the need to install pipelines with a high degree of reliability, it is necessary to lay a pipe connected to a vessel up to the seabed, whose depth varies, ranging from 1 to 3 km. At this depth the pipeline is subject to a high hydrostatic pressure, having to endure a strong compression, moreover, the long path of the pipeline, from the vessel to the seabed, also causes the pipeline to be even heavier.

The underwater equipment used to install and/or retrieve pipelines and other underwater equipment need to have good buoyancy, requiring the introduction of some material on the equipment, usually air, other gases or materials such as foam, polyurethane or similar, in order to obtain a specific gravity specific smaller than the one of the water. Insofar as the depth increases, the pressure applied to the product also increases, so that said materials contract, reducing their volume, thereby reducing buoyancy.

The known buoys of the prior art have density limitations, that is, at great depths they have higher densities not to be crushed by the water pressure, resulting in a lower buoyancy force. To compensate for this deficiency, prior art buoys feature great dimensions and weight, increasing the manufacturing cost and making handling difficult.

Some prior art documents and their advantages are listed below.

Patent document No. BR PI9306875-1 describes a marine or underwater device, underwater flow line and process for installation or recovery of a marine or underwater device, such as pipelines and equipment where the marine or underwater apparatus comprises an impermeable container associated with the device, whose container is firmly compacted with hollow microspheres to a density in which, when submerged in use, the internal pressure of the microspheres is greater than or equal to the water pressure in the apparatus.

One of the drawbacks of the device described in the aforementioned document lies in the fact that it has rubber rings to mitigate damage caused by impacts and/or shock. Moreover, the presence of hoisting points reduces the ability to mount different types of buoys, and the fragility of the hollow microspheres to shock/impact when they are dried or without the presence of a liquid medium.

Patent document No. BR PI9500622-2 provides a process for the installation of a pipeline located in a underwater bed, wherein a pipe string is lowered from the installation to the floor, wherein part of the pipe string is located between the water surface and the underwater bed, at least partially supported by support means which engage the pipe string, in which an axial displacement is performed between the support means on one side and the pipe string on the other side. A heavy pipeline can be well installed on a deep sea bed to a depth, for instance, of the order of magnitude of 1 to 3 km, wherein the capacity of traction benches on board in the installation of the pipe foundation can be reduced.

One of the drawbacks of the aforementioned document lies in the fact that the protection rings undergo the risk of detaching from the buoys during the operation. Another encountered problem is the difficulty of mounting a set of two or more buoys of different models, due to the fact that the only hoisting point is in the bottom and top end.

Another known prior disclosure is document No. BR102012029254-8, which relates to a buoy for use in underwater petroleum exploration, with a hollow internal space, and comprising an outer body, made preferably in engineering plastic with a density lower than 1 $g/cm^3$, said body having pressure equalization holes in its wall and, inside it, internal bodies with a density preferably lower than 0.5 $g/cm^3$. The inner wall surface of the outer body has a perforated mantle with anti-shock properties and with a hole diameter smaller than the diameter of the inner bodies. In practice the typical high frequency limit is 1 Hz. The method in the frequency domain can be applied to low and high frequencies, however, it requires a long measuring time for very low frequencies.

The buoy described in the aforementioned document is an evolution when compared with the prior art, however its drawback lies in the fact that its manufacturing process is slower and requires more control over the productive processes of the thrust element, as well as over the preparation of its components. Another drawback in the production chain of these buoys is the constant "weight×volume" relationship during the manufacturing thereof.

The initial proposition of the buoy such as described in document No. BR102012029254-8 resulted in the development of the buoy for the installation of the underwater equipment, subject matter of the instant invention, whose aim is to improve the buoy buoyancy using gas microbubbles with quartz spherical body, vinyl material with closed nanocells and a special resin, thus preventing the problems listed above.

A simplified summary of the embodiments described in the instant invention will be described, such a summary being not an extensive general overview of all the embodiments contemplated herein. Moreover, it aims neither to identify key or critical elements nor to delineate the scope of such embodiments. Its sole purpose is that of providing some concepts of the simplified forms, as an introduction to the more detailed description that is provided below.

SUMMARY OF THE INVENTION

The instant invention provides a buoy for the installation of underwater equipment consisting of gas microbubbles with quartz spherical body, vinyl material of closed nanocells, special resin, having a body comprising top and bottom lids, through-tubes fixed to the lids by fixing nuts, manufactured in engineering plastic with a density lower than 1 $g/cm^3$.

The main advantage of the instant invention is that of considerably improving the buoyancy of the buoy due to the weight decrease thereof.

Another advantage of the instant invention is that of providing a buoy extremely resistant to impacts against objects and/or underwater equipment.

Another advantage of the invention is that of allowing the buoy to be bound/attached to one or more buoys of the same type or of a different type, and/or underwater equipment.

Another advantage of the present invention is that of increasing the float buoyancy by modifying only the way of producing the thrust element, i.e., the same buoy model can provide a controlled thrust variation with thrust element adopted in the manufacture.

In order to achieve the aforementioned objectives and similar objectives, one or more embodiments include aspects that will be described below and specifically defined in the claims. The following description and the accompanying drawings show details of certain illustrative aspects of the disclosed embodiments. However, these aspects indicate only some of the many ways in which the principles of various embodiments can be used. Moreover, all the described embodiments are intended to include such aspects and their equivalents.

BRIEF DESCRIPTION OF THE DRAWINGS

The characteristics, the nature and the advantages of the instant description will be more evident from the detailed description provided below, when read together with the drawings, in which the same references refer to the same elements, where.

DETAILED DESCRIPTION OF THE PREFERRED EMBODIMENT

The instant invention relates to a BUOY FOR THE INSTALLATION OF UNDERWATER EQUIPMENT, preferably used in equipment associated with petroleum underwater exploration, whose installation or handling is conducted through a remotely operated vehicle (ROV). The installation of the buoys on the launch line or of the associated equipment can also be performed on board and remotely operated vehicle (ROV) only monitor the operation.

Figure 1:
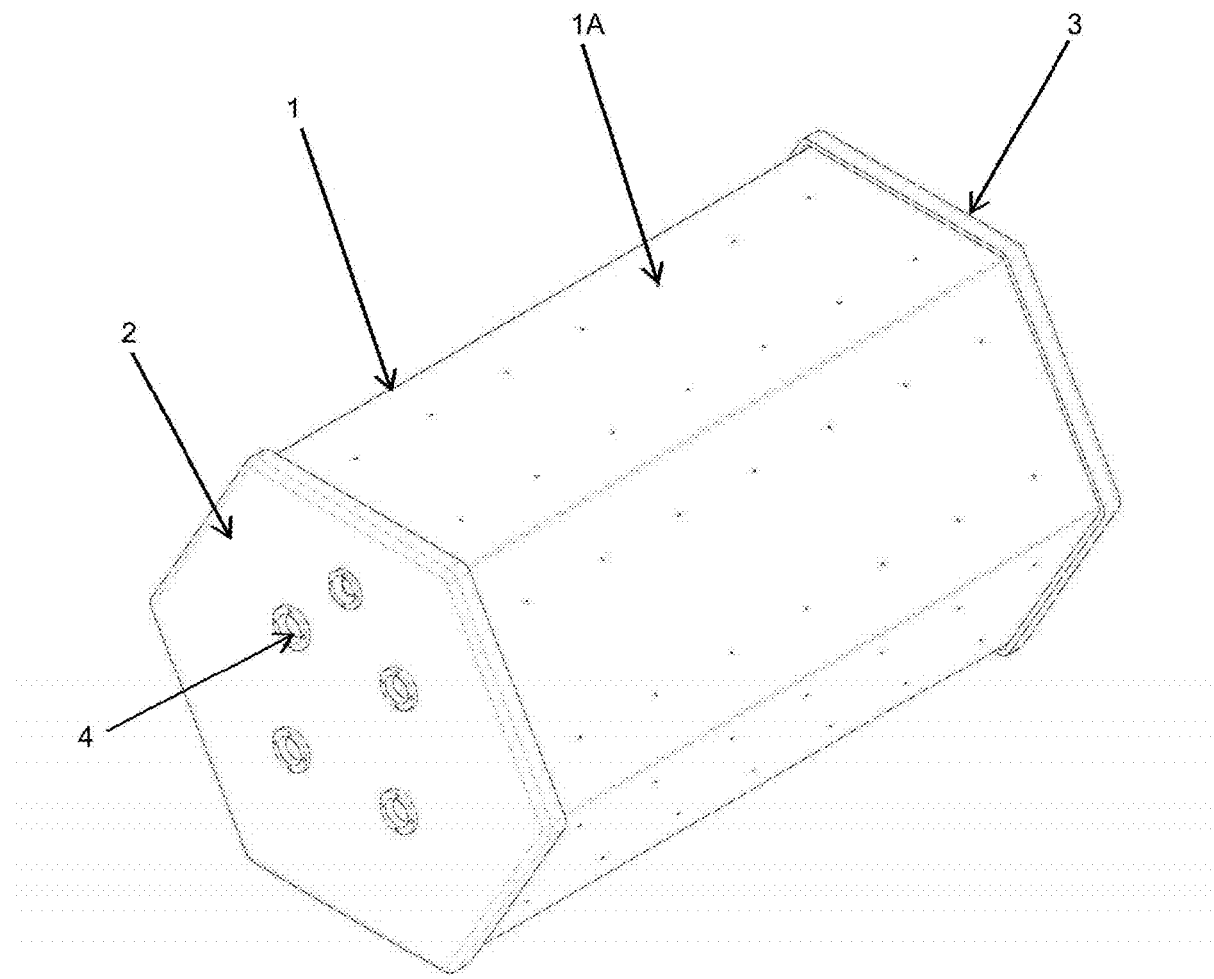
FIG. 1—shows a perspective view of the buoy, subject matter of the instant invention.

Now reference will be made to FIG. 1, that shows the buoy that comprises an outer body (1) made of engineering plastic, preferably polypropylene, nylon or polyurethane, with density lower than 1 g/cm$^3$, wherein the outer body can have a plurality of holes (1A) along the walls, in order to equalize the internal and external pressure of the buoy, that is endowed with a top lid (2) and a bottom lid (3).

Figure 2:
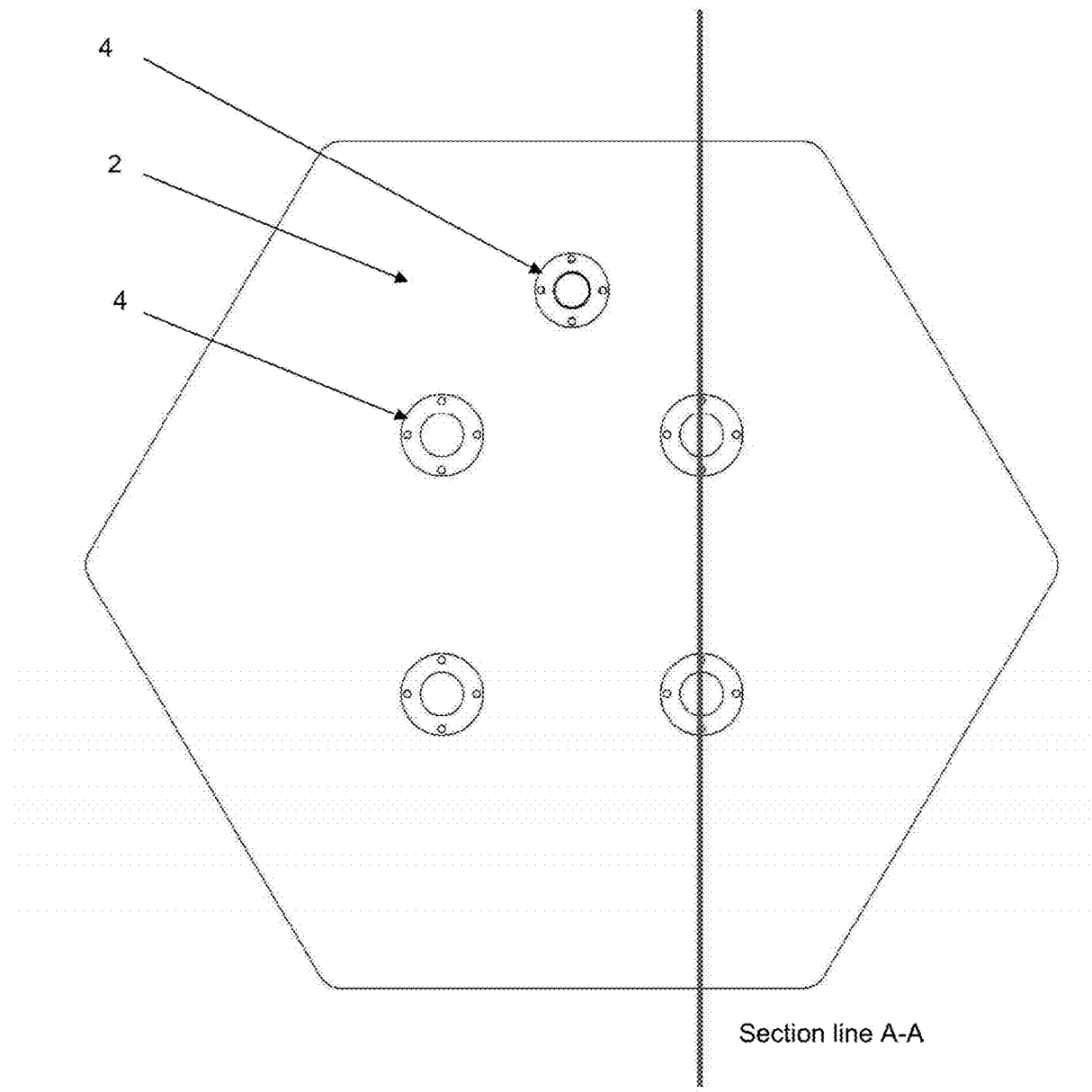
FIG. 2—shows a front view of the buoy of FIG. 1.

Now reference is made to FIG. 2, which illustrates a view of the top lid (2), identical to the bottom lid (3) of the buoy, which are provided with, for example, fixing nuts (4) for the passage pipes (5) extending internally along, preferably the entire longitudinal extent of, the buoy.

The passage pipes (5) are provided for the passage of steel cables used when the buoy is in operation, allowing the buoy to be fixed/fastened to the equipment or to the other buoy. This fastening system of two or more buoys allows increasing the thrust generated by all the buoys.

Figure 3:
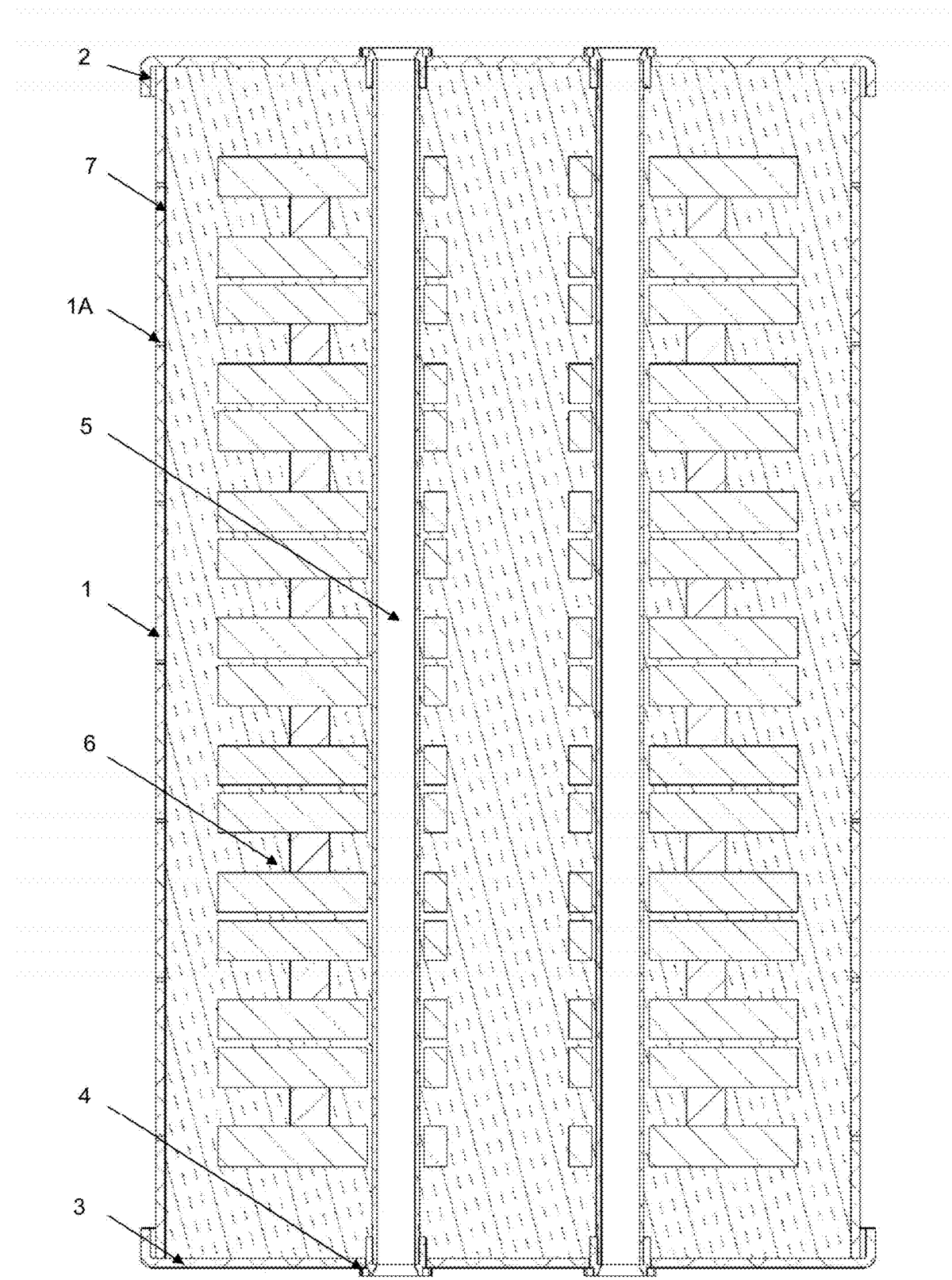
FIG. 3—shows a sectional view of the buoy of FIG. 2.

Now, reference is made to FIG. 3, which shows an A-A sectional view of FIG. 2. It can be seen that, internally, the buoy has a plurality of thrust elements or enhanced buoyant (6) comprising gas microbubbles with quartz generally spherical body, low density material, such as vinyl material of closed cells and resin for protecting the buoyant elements. Said thrust elements (6) are inserted inside the buoys arranged in rows and ordered, and the amount will depend on the nominal thrust required by the operation. The concept of the thrust element is responsible for low weight and high resistance to hydrostatic pressure. The thrust element is obtained from a controlled and equated mixture between the main components, i.e., gas microbubbles with quartz spherical body, vinyl material of closed cells and special resin, wherein the ratio of each component defines the final density of the thrust element and its mechanical and thermal resistance properties.

The buoy further comprises an anti-shock mantle (7) manufactured from a special fabric with synthetic fibers, which allows retaining the plurality of thrust elements (6) inside the buoy. Moreover, said anti-shock mantle allows internal pressure balance and acts as a dampening layer of thrust elements (6).

In the preferred embodiment of the invention the buoy displays a hexagonal cylindrical configuration that facilitates its storage and prevents the buoy from "rolling" from side to side when stored. However, other shapes of buoy can be used, such as squared, rounded, etc., with the same objective of the scope of the invention, interpreted as comprised by the instant invention.

In practice, the buoy of the instant invention provides a significant improvement in the conditions of assembly and fixing the buoy to the underwater equipment, apart from increasing the thrust considerably.

Those skilled in the art would easily understand that the invention can undergo modifications without thereby departing from the concepts set forth in the foregoing description. These modifications must be considered as included within the scope of the invention. Accordingly, the particular embodiments described in detail above are merely illustrative and not restrictive as to the scope of the invention, the full extension of the appended claims and any and all equivalents thereof must be given thereto.

What is claimed is:

1. A buoy for the installation of underwater equipment, comprising an outer body having a top portion and a bottom portion and at least one side wall extending between said top and bottom portions and further having an anti-shock mantle disposed internally to said at least one side wall, said at least one side wall having a plurality of holes therethrough and said shock mantle having a plurality of holes coincident to the plurality of holes in the at least one side wall to equalize the internal and external pressure of the buoy, in use, wherein the buoy additionally comprises passages extending internally along all the extension of the buoy, which are fastened to the top and bottom portions and, provided also with a plurality of buoyant elements internally arranged, which are made of generally spherical quartz bodies containing gas microbubbles.

2. The buoy for the installation of underwater equipment, according to claim 1, wherein the buoyant elements are arranged in rows and ordered inside the buoy.

3. The buoy of claim 1, further comprising a resin configured to protect the buoyant elements.

4. The buoy of claim 1, further comprising a low density closed cell material.

5. The buoy of claim 4, wherein the low density closed cell material is a vinyl material.

* * * * *

UNITED STATES PATENT AND TRADEMARK OFFICE
CERTIFICATE OF CORRECTION

PATENT NO. : 10,214,265 B2
APPLICATION NO. : 15/337621
DATED : February 26, 2019
INVENTOR(S) : Gilmar Souza Cupolillo et al.

It is certified that error appears in the above-identified patent and that said Letters Patent is hereby corrected as shown below:

On the Title Page

Item (65), Prior Publication Data, Line 3, below "May 4, 2017" insert --(30) Foreign Application Priority Data, Oct. 29, 2015 (BR) 10 2015 027544 7--.

In the Claims

Column 4, Line 62 (approx.), in Claim 4, after "a" delete "low density".

Column 4, Line 64 (approx.), in Claim 5, after "the" delete "low density".

Signed and Sealed this
Seventh Day of April, 2020

Andrei Iancu
*Director of the United States Patent and Trademark Office*